United States Patent Office 3,452,817
Patented July 1, 1969

3,452,817
SECONDARY RECOVERY OF PETROLEUM BY WATERFLOODING
Wayne S. Fallgatter, Tulsa, Okla., assignor to Cities Service Oil Company, Tulsa, Okla., a corporation of Delaware
No Drawing. Continuation-in-part of application Ser. No. 334,008, Dec. 27, 1963. This application Jan. 5, 1967, Ser. No. 607,403
Int. Cl. E21b 43/20, 43/16
U.S. Cl. 166—305                                    9 Claims

ABSTRACT OF THE DISCLOSURE

A secondary recovery, water flooding process in which a surface active agent is employed in conjunction with an organic water thickening compound. By employing the surface active agent in a concentration within the range of from 0.1 to 3.0 weight percent in a waterflood containing sufficient water thickening compound to establish a water flood/crude oil viscosity ratio of at least about 0.3/1.0, greatly increased amounts of oil are recoverable over the amounts obtained by use of water thickening agents and surface active agents used alone or in combinations other than those provided for herein.

Cross-reference to related application

This application is a continuation-in-part of my co-pending application S.N. 334,008, filed Dec. 27, 1963, now abandoned.

Background of the invention

In the secondary recovery of oil by water flooding, the addition of various types of water thickening agents to increase the viscosity of the flood water improves the displacement ability of the flood water and reduces its tendency to "finger" through the more permeable portion of the reservoir. Likewise, the addition of surface active agents to the water flood reduces the interfacial tension between the oil and flood water and promotes the wettability of formation surfaces by water. The prior art has long recognized these advantages resulting from the use of water thickening agents or surface active agents in water flooding. In addition, U.S. Patents 2,341,500 and 3,096,820, relating primarily to the use of a viscous liquid in water flooding, disclose that small amounts of surface active agents may be added to or incorporated in the viscous liquid, since their detergent properties enhance the removal of residual oil from the formation. It is generally known in the art that the addition of approximately 100–200 p.p.m. or 0.01–0.02 weight percent of surface active agent will produce the desired decrease in interfacial tension between the flood water and the oil-wet particles in the formation. The use of larger quantities of surfactant for this purpose would be superfluous and would normally be avoided in the interest of optimizing of economic efficiency of the water flood process.

The additives suggested by the prior art have, in general, increased the efficiency of water flooding. The amount of additional oil recovered, however, has not been entirely satisfactory, and a considerable portion of the oil in the reservoir has remained unrecovered. Furthermore, the addition of surface active agent in a thickened water drive has generally been considered by those skilled in the art as a means for improving the facility with which oil is removed by the thickened water drive, rather than as a means for significantly increasing the amount of oil recovered during such a thickened water, secondary recovery process.

It is an object of this invention to provide an improved secondary recovery process for the production of oil from subterranean reservoirs.

It is a further object of this invention to provide an improved water flooding process for recovering oil from petroleum-containing formations.

Other objects and advantages will appear from the following description of the invention, the novel features of which will be particularly pointed out hereinafter in the appended claims.

Summary of the invention

The objects of this invention are accomplished by employing as the driving fluid an aqueous solution that includes a water thickening agent and an unusually large quantity of a water soluble surface active agent. By combining these treatments within specified proportions, the amounts of additional oil recovered during water flooding is markedly increased over that obtained when using either treatment alone or that which would be expected from including a small amount of surface active agent in a viscous water flood as suggested by the prior art. Sufficient water thickening compound is employed so that the water flood/crude oil viscosity ratio is at least about 0.3/1.0. The surface active agent is employed at a concentration of from about 0.1 to 3.0 weight percent.

Detailed description of the invention

Crude oils generally have a viscosity falling within the range of from about 5 to about 20 cps. although the viscosities of crudes have varied from those as low as about 1 or 2 cps. to those ranging up to 1,000 cps. Such high viscosity crudes are very uncommon, however, particularly at reservoir temperatures.

Any efficient organic water thickening agent may be employed in accordance with this invention. An efficient water thickening agent is one that, when added in an amount within an allowable concentration range, will produce the necessary increase in the viscosity of the water flood. The water flood employed in accordance with this invention should have a viscosity such that the water flood/crude oil viscosity ratio is at least 0.3/1.0. A suitable water thickening agent should be able to achieve this desired viscosity ratio when employed in a concentration within the range of from about 0.5 to 5.0% by weight of the aqueous solution. The beneficial results of this invention are not obtained when an inefficient water thickening agent is employed, thus requiring more than about 5.0% concentration in order to achieve the desired water flood/crude oil viscosity ratio.

A wide variety of water-soluble polymers may be used to increase the viscosity of the water drive. For example, polymers such as methyl cellulose, starch, guar gum, gum tragacanth, sodium alginate, and gum arabic may be employed. Illustrative of the many commercially available water thickening agents that are suitable for use in accordance with this invention are carboxymethylcellulose, known as Hercules CMC 70 S Medium; carboxyvinyl polymer, known as Goodrich Carbopol 934; polyvinyl alcohol, known as Elvanol 50–42; polyacrylamide, known as American Cyanamide Cyanamer P 26. Particularly preferred among the water thickening agents is carboxymethylcellulose.

The surface active agent employed should be sufficiently soluble in water to permit use at concentrations of above 0.1 to about 3.0% by weight of the aqueous solution. The surface active agent employed may be anionic, cationic, nonionic, or a combination of these types. Many surface active agents that are primarily oil-soluble have sufficient water solubility to permit their use in aqueous solutions within the concentration range indicated above. Also, many primarily oil-soluble anionic and cationic surfactants can be rendered primarily water-soluble by neutralizing them with inorganic acids or bases to form salts.

Illustrative of the various surfactants that can be employed in this invention are water-soluble or water-dispersible compounds such as alkyl aryl sulfonates, fatty alcohol ethylene oxide condensates, polyoxyethylated alkyl phenol, polyoxyethylene sorbitan fatty acid esters, glycerides of fatty acids, diethanolamine fatty acid condensates, quaternary ammonium halides, alkyl sulfates, and ethoxylated sulfates. Additional surface active agents that may be employed in accordance with this invention are listed in Soap and Chemical Specialties, in five parts, from December 1957 through April 1958.

Examples of suitable anionic surface active agents employed in the present invention include: sodium tridecyl sulfate polyglycol ether, 30% active, marketed as Trepenol S 30T; sodium petroleum sulfonate, marketed as Promor SS 20; amine dodecylbenzene sulfonate, marketed as Trepolate YLA; and sodium oleate. An example of a suitable cationic surfacant is dodecylbenzyl trimethyl ammonium chloride, marketed as Trepsan DBM. Examples of suitable nonionic surfactants are lauric acid diethanolamide, marketed as Trepoline L; polyoxyethylene sorbitan trioleate, marketed as Tween 85; nonyl phenoxy polyoxyethylene ethanol, marketed as Igepal CO 630.

The aqueous solution containing the water thickening agent and the water soluble surface active agent may be injected into the formation either after a conventional water flooding or at the beginning of water flooding following primary oil production. In some cases, it may be beneficial to employ multiple treatments in which the aqueous solution is added in slugs separated by ordinary water. Especially satisfying results have been obtained employing this technique.

Numerous factors affect the amount of oil that may be recovered in accordance with this invention. Some of these factors are the porosity of the formation, the thickness of the formation, the type and concentration of water thickening agents employed, the viscosity of flood water, the concentration and type of surface active agent employed, the characteristics of the crude oil, the kind and amount of salts present in the connate water, the recovery pattern, and the spacing between wells. The amount of flood water employed in accordance with this invention will, therefore, vary considerably from one application to another. In general from about 2% to about 50% pore volume of aqueous solution will be utilized, based upon the reservoir pore volume.

The advantages of the process of this invention can be more readily understood from consideration of the following examples illustrating embodiments of the process.

Example 1

Consolidated sandstone cores ten inches long and two inches in diameter are saturated with brine and driven to minimum brine concentration with Kentucky crude oil, having a viscosity of 6 cps. The cores are then flooded with brine until oil production ceased. The watered out cores were then flooded with aqueous solutions containing a water thickening agent and a surface active agent in accordance with the present invention. The water thickening agent employed was CMC 70 S Medium, and the water soluble surface active agent was one part Trepenol S 30T, 30% active, mixed with one part Trepoline L, 99% active. Approximately 50% pore volume of aqueous solution was employed as the driving fluid. The results are set forth in Table I as follows.

TABLE I

| Water thickener, wt. percent | Surface active agent, wt. percent | Viscosity driving fluid (cp.) | Viscosity ratio, water:oil | Oil yield, percent pore volume |
|---|---|---|---|---|
| 1.5 | 0 | 113 | 18.8:1 | 1.9 |
| 1.5 | 0.01 | 113 | 18.8:1 | 2.2 |
| 1.5 | 0.05 | 113 | 18.8:1 | 3.8 |
| 1.5 | 0.1 | 113 | 18.8:1 | 5.5 |
| 1.5 | 0.5 | 113 | 18.8:1 | 19.6 |
| 1.5 | 1.0 | 113 | 18.8:1 | 19.7 |
| 1.5 | 2.0 | 113 | 18.8:1 | 18.3 |
| 1.5 | 3.0 | 113 | 18.8:1 | 17.2 |
| 1.0 | 0 | 32 | 5.3:1 | 0.6 |
| 1.0 | 0.01 | 32 | 5.3:1 | 0.8 |
| 1.0 | 0.05 | 32 | 5.3:1 | 1.6 |
| 1.0 | 0.1 | 32 | 5.3:1 | 2.6 |
| 1.0 | 0.5 | 32 | 5.3:1 | 8.9 |
| 1.0 | 1.0 | 32 | 5.3:1 | 13.1 |
| 1.0 | 1.5 | 32 | 5.3:1 | 13.6 |
| 1.0 | 3.0 | 32 | 5.3:1 | 13.2 |
| 0.5 | 0 | 12.5 | 2.1:1 | 1.6 |
| 0.5 | 0.01 | 12.5 | 2.1:1 | 1.6 |
| 0.5 | 0.05 | 12.5 | 2.1:1 | 1.7 |
| 0.5 | 0.1 | 12.5 | 2.1:1 | 1.8 |
| 0.5 | 0.5 | 12.5 | 2.1:1 | 5.7 |
| 0.5 | 1.0 | 13.0 | 2.2:1 | 11.5 |
| 0.5 | 2.0 | 13.2 | 2.2:1 | 12.5 |
| 0.5 | 3.0 | 13.8 | 2.3:1 | 11.7 |
| 0 | 0.5 | 1.0 | 0.17:1 | 0.3 |
| 0 | 1.0 | 1.1 | 0.18:1 | 0.3 |
| 0 | 3.0 | 1.3 | 0.22:1 | 0.1 |

The concentration of the water thickener and the surface active agent employed in the water flood is expressed in percent by weight of the total weight of the water flood. The oil yield is expressed in terms of percent of the pore volume of the core, the oil yield representing the additional recovery over and above that recovered by ordinary water flooding.

The data in Table I clearly demonstrates the great improvement in oil recovery obtainable by employing the present invention as opposed to that obtainable by employing either a water thickening agent or a surface active agent alone or that which would be expected from the addition of a small, conventional amount of surface active agent in a viscous water drive.

Example 2

In order to demonstrate the effectiveness of various water thickening agents in the present invention, a series of runs were made in which several water thickening agents were employed with a common surface active agent. The procedure followed was that set forth in Example 1. The surface active agent employed was one part Trepenol S 30T, 30% active, mixed with one part Trepoline L, 99% active. The crude oils employed were Kentucky crudes having a viscosity of 6 cps. Experimental results are set forth in Table II.

TABLE II

| Water thickener | Wt. percent | Surface active agent, wt. percent | Viscosity driving fluid, cp. | Viscosity ratio, water:oil | Oil yield percent pore volume |
|---|---|---|---|---|---|
| Carbopol 934 | 0.33⅓ | 1.0 | 30.6 | 5.1:1 | 6.4 |
| Marathon Marasperse N (sodium Lignosulfonate) | 25.0 | 1.0 | 4.6 | 0.8:1 | 4.5 |
| Elvanol 50-42 | 4.0 | 1.0 | 31.2 | 5.2:1 | 21.2 |
| CMC 70 S Medium | 1.0 | 1.0 | 32.0 | 5.3:1 | 13.5 |
| Cyanamer P 26 | 2.0 | 1.0 | 14.4 | 2.4:1 | 12.1 |

Approximately 50% pore volume of aqueous driving fluid having a viscosity within the range of 5–45 cps. was employed.

The data in Table II shows that any efficient water thickening agent used in combination with a surface active agent in accordance with the present invention will result in substantial improvement in the quantity of oil recovered by water flooding. The large quantity of sodium lignosulfonate required to obtain the desired increase in viscosity adversely affected the oil recovery properties of the water flood. Since sodium lignosulfonate has some surface active properties, this additive should preferably be used as a surface active agent together with a more efficient water thickening agent.

Example 3

Water floods were conducted in accordance with the procedure of Example 1 in which various types of water soluble surface active agents were employed together with CMC 70 S Medium, employed in a concentration of one percent by weight of the aqueous water flood. The viscosity of the driving fluids was approximately 32 cps., and the amount of driving fluid employed was approximately 50% pore volume. The crude oil employed, having a viscosity of 5 cps., was taken from the Hawes Lease, Butler County, Kentucky. Experimental results are indicated in Table III.

ratios is demonstrated by the experimental results presented in Table IV. The water thickening agent employed in these runs was CMC 70 S medium. The surface active agent was one part Trepoline L and one part Trepenol S 30T (30% active). The procedure followed was that set forth in Example 1.

TABLE IV

| Crude oil | Viscosity (cp.) | Wt. percent thickener | Wt. percent surfactant | Driving fluid | | Water/oil Viscosity ratio | Oil yield (percent P.V.) |
| --- | --- | --- | --- | --- | --- | --- | --- |
| | | | | Slug size (P.V.) | Viscosity (cp.) | | |
| Hawes | 5.0 | 0.5 | 1.0 | ½ | 12.3 | 2.5 | 11.5 |
| Weller B | 6.2 | 1.0 | 1.0 | 1 | 32.0 | 5.2 | 13.1 |
| Do | 6.2 | 1.0 | 1.9 | ½ | 32.0 | 5.2 | 13.5 |
| Payoa | 86.7 | 1.0 | 1.0 | ½ | 37.0 | 0.4 | 13.9 |

The crude oils employed were Hawes Lease, Hardinsburg Sand, Silver City Pool, Butler County, Kentucky; Weller B Lease, Tar Springs Sand, Weller Pool, Ohio County, Kentucky; and Payoa No. 1 Well, Upper Zone, Colombia, South America.

The concentration of the water thickening agent and the surface active agent are again expressed in terms of the percent by weight of the aqueous solution used as the water flood. The slug size and the oil yield are in terms of core pore volume.

The results set forth in Table IV demonstrate that the present invention is applicable, not only to average viscosity crudes, but to very viscous crudes and at very low water flood/crude oil viscosity ratios.

Example 5

Very efficient thickners are active at low concentrations. One example, Dow AP 30 polyacrylamide, was employed at a concentration of 0.17 weight percent in conjunction

TABLE III

| Surface active agent | Type | Wt. percent | Oil yield, percent pore volume |
| --- | --- | --- | --- |
| Trepoline L (1 part) and Trepenol S 30T (1 part) | Nonionic and Anionic | 1.0 | 13.5 |
| Promor SS 20 (7 parts) and Tween 85 (3 parts) | Anionic and Nor ionic | 0.75 | 8.3 |
| Promor SS 20 | Anionic | 1.0 | 16.5 |
| Trepolate YLA | do | 1.0 | 23.2 |
| Sodium Oleate | do | 1.0 | 10.6 |
| Trepsan DBM | Cationic | 1.0 | 7.5 |
| Igepal CO 630 | Nonionic | 1.0 | 6.7 |

The data in Table III demonstrates that the water soluble surface active agent employed may be either anionic, cationic, nonionic, or a combination of these types.

Example 4

Operation at various flood water/crude oil viscosity with one of the more efficient surfactants, Trepolate YLA, in varying concentrations. One-half pore volume of thick water was injected, followed by fresh water. The procedure followed was that set forth in Example 1. The oil employed was Hawes crude. The results are set forth in Table V.

TABLE V

| Treatment size, P.V. | Water thickener, wt. percent | Surfactant, wt. percent | Driving fluid viscosity cp. | Water:oil viscosity ratio | Oil yield, percent pore volume |
|---|---|---|---|---|---|
| 0.5 | 0 | 0.1 | 1.0 | 0.2:1 | 0.7 |
| 0.5 | 0 | 0.5 | 1.0 | 0.2:1 | 1.5 |
| 0.5 | 0 | 1.0 | 1.6 | 0.32:1 | 13.2 |
| 0.5 | 0 | 3.0 | 4.2 | 0.84:1 | 15.2 |
| 0.5 | 0.17 | 0.0 | 23 | 4.6:1 | 1.5 |
| 0.5 | 0.17 | 0.01 | 23 | 4.6:1 | 2.4 |
| 0.5 | 0.17 | 0.05 | 23 | 4.6:1 | 7.8 |
| 0.5 | 0.17 | 0.125 | 24 | 4.8:1 | 14.9 |
| 0.5 | 0.17 | 0.25 | 25 | 5:1 | 23.8 |
| 0.5 | 0.17 | 0.50 | 30 | 6:1 | 28.4 |
| 0.5 | 0.17 | 1.0 | 35 | 7:1 | 27.0 |
| 0.5 | 0.17 | 2.0 | 40 | 8:1 | 25.3 |
| 0.5 | 0.17 | 3.0 | 45 | 9:1 | 24.3 |
| 0.25 | 0.17 | 0.25 | 25 | 5:1 | 10.7 |
| 0.33 | 0.17 | 0.25 | 25 | 5:1 | 21.0 |
| 0.50 | 0.17 | 0.25 | 25 | 5:1 | 23.8 |
| 0.5 | 0.02 | 0.5 | 2.8 | 0.56:1 | 18.2 |
| 0.5 | 0.05 | 0.5 | 5.2 | 1:1 | 24.3 |
| 0.5 | 0.085 | 0.5 | 10 | 2:1 | 25.4 |
| 0.5 | 0.10 | 0.5 | 13 | 2.6:1 | 26.2 |
| 0.5 | 0.17 | 0.5 | 30 | 6:1 | 28.4 |
| 0.5 | 0.20 | 0.5 | 33 | 7.6:1 | 25.6 |

Trepolate YLA, which was employed in the work indicated in Table V, is one of the more generally preferred surfactants employed in the practice of the present invention. As shown, the use of this surfactant alone, in concentrations of 1% and 3% by weight, resulted in increased oil recoveries of 13.2 and 15.2% respectively. This was in part attributable to the combined thick water-surfactant drive characteristics of this surfactant at higher concentrations. For example, the viscosity of the driving fluid at 3.0% surfactant concentration was 4.2 cps. Nevertheless, even in the case of this particularly effective surfactant, the results obtainable employing the combination of thickener and surfactant claimed herein were far greater than what one could reasonably expect from the results obtainable by thickener and surfactant alone. The thickener alone at 0.17% concentration causes an increase in oil recovery of 1.5%. The thickener-surfactant combination of the present invention results in an increased oil recovery at 3.0% surfactant concentration of 24.3%. This increase is far in excess of what one might reasonably expect from the results obtainable with surfactant and water thickening agent employed alone.

It will be understood that various changes in the detail that has been described herein in order to explain the nature of the invention may be made by those skilled in the art within the principle and scope of the invention as expressed in the appended claims.

I claim:
1. In the secondary recovery of oil from oil bearing formations by means of water flooding with flood water incorporating a sufficient amount of an organic water thickening compound so that the water flood/crude oil viscosity ratio is at least about 0.3/1.0, the improvement comprising incorporating into the flood water a water soluble surface active agent having a concentration within the range of from about 0.1 to 3.0 weight percent, whereby a significant improvement in oil recovery is obtained over the results obtainable by use of a thickening compound or a surface active agent alone or by the use of a sufficient quantity of surface active agent in a thickened water drive to decrease the interfacial tension between the flood water and the oil-wet particles in the formation.

2. The method of claim 1 in which the surface active agent is anionic.

3. The method of claim 1 in which the organic water thickening compound is carboxymethylcellulose.

4. The method of claim 1 in which the organic water thickening compound is polyvinyl alcohol.

5. The method of claim 1 in which the organic water thickening compound is a carboxyvinyl polymer.

6. The method of claim 1 in which the organic water thickening compound is polyacrylamide.

7. The method of claim 1 in which the amount of said flood water introduced into said formation is from about 2 to about 50 percent of the reservoir pore volume.

8. The method of claim 7 in which said flood water is added in two slugs and including a plain water flood treatment intermediate thereto.

9. The process of claim 1 in which the surface active concentration is at least about 0.5.

References Cited

UNITED STATES PATENTS

| | | | |
|---|---|---|---|
| 2,341,500 | 2/1944 | Detling | 166—9 |
| 2,827,964 | 3/1958 | Sandiford et al. | 166—9 |
| 3,039,529 | 6/1962 | McKennon | 166—9 |
| 3,208,518 | 9/1965 | Patton | 166—9 |
| 3,292,696 | 12/1966 | Sandiford | 166—9 |
| 3,308,883 | 3/1967 | Foster | 166—9 |
| 3,348,611 | 10/1967 | Reisberg | 166—9 |
| 3,372,749 | 3/1968 | Williams | 166—9 |

OTHER REFERENCES

Johansen et al.: "Detergents for Petroleum Displacement," (Parts I and II), Soap and Chemical Specialties, October 1955, vol. 31, No. 10 (pp. 41–44, 79 and 81) and November 1955, vol. 31, No. 11 (pp. 53–55).

STEPHEN J. NOVOSAD, Primary Examiner.

U.S. Cl. X.R.

166—268